Sept. 8, 1925.
A. LEGBAND
SAW FRAME TABLE
Filed April 20, 1925
1,552,850
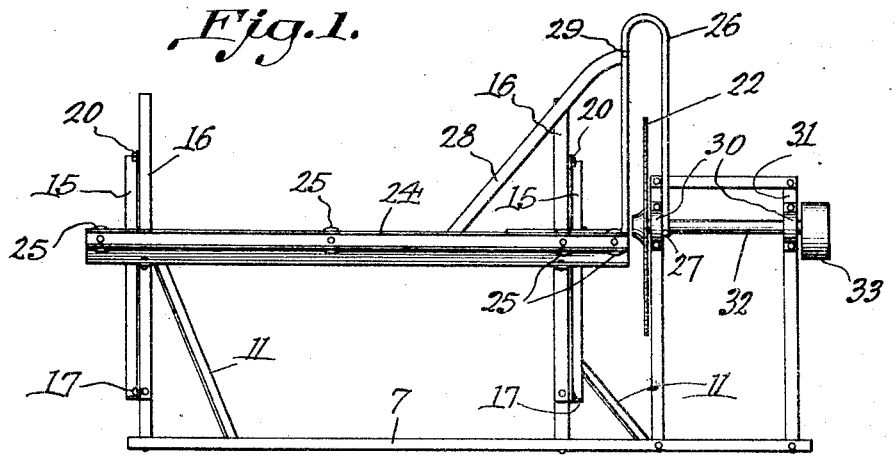
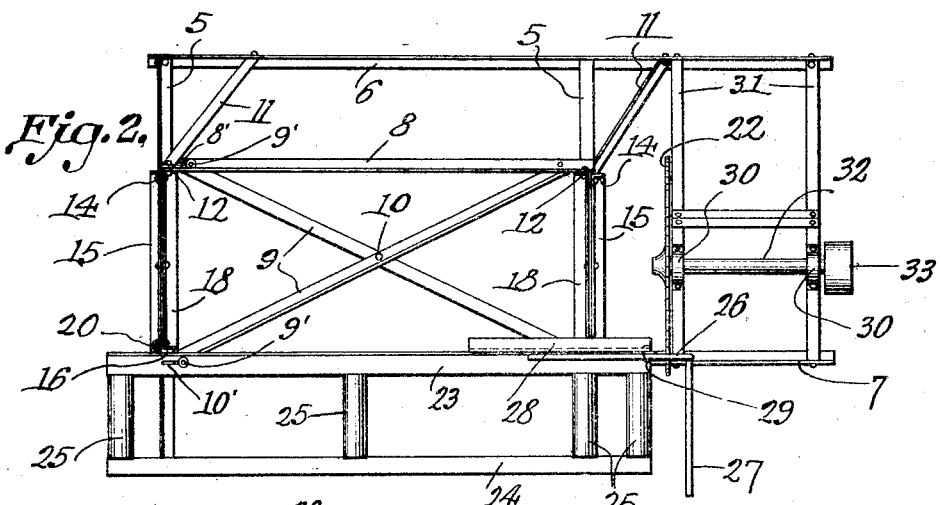
Inventor
Arthur Legband
By C. A. Snowles
Attorney Patented Sept. 8, 1925.

1,552,850

UNITED STATES PATENT OFFICE.

ARTHUR LEGBAND, OF SCRIBNER, NEBRASKA.

SAW-FRAME TABLE.

Application filed April 20, 1925. Serial No. 24,547.

*To all whom it may concern:*

Be it known that I, ARTHUR LEGBAND, a citizen of the United States, residing at Scribner, in the county of Dodge and State of Nebraska, have invented a new and useful Saw-Frame Table, of which the following is a specification.

This invention relates to wood sawing tables and aims to provide a novel form of table which, when moved forwardly to bring a log or the like into engagement with the saw, will move in a horizontal plane, eliminating the necessity of lifting the weight of the log or article being cut.

Another important object of the invention is to provide means to facilitate the handling of a log while on the table so that the log may be moved towards the saw with the minimum amount of exertion on the part of the operator.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a side elevational view of a saw and table constructed in accordance with the invention.

Figure 2 is a plan view thereof.

Figure 3 is an end elevational view of the saw frame.

Referring to the drawing in detail, the saw frame includes angle bars 5 which constitute the end members of the frame, the angle bars 5 being connected by means of the angle bars 6 and 7 respectively, there being provided a third angle bar 8 formed with an elongated opening 8' that connects the end bars 5 at points intermediate their ends to further brace the saw frame.

Angularly disposed brace bars 9 are also connected with the end bars and are connected at points intermediate their ends as at 10 so that the frame is substantially braced against strains directed thereto from all directions. These bars 9 carry bolts 9', one of which bolts operates in the opening 8', the opposite bolt 9' operates in the opening 10' formed in the bar 23, to be hereinafter more fully described. At points adjacent to the ends of the frame are bars 11 that are disposed at oblique angles with respect to the bars 6 and 8, the bars 11 extending upwardly to connect with the vertical bars 12 of the saw frame.

These bars 12 are provided with elongated openings 13 arranged adjacent to their upper ends, which openings accommodate bolts 14 carried at the upper ends of the angle bars 15 that have pivotal connection with the bars 16 of the saw table, as at 17.

Pivotally connected with the bars 15 which are arranged at the ends of the saw table are bars 18 which are also pivotally connected to the vertical bars 12 at 19. The bars 16 are connected with the bars 15 and 18, the bars 18 being provided with bolts 20 at their upper ends that move through the elongated opening 21 of the bars 16 so that as the saw table is moved inwardly towards the saw blade which is indicated at 22, the upper ends of the bars 18 may move vertically while the table proper is moving in a horizontal plane.

As clearly illustrated by Figure 2 of the drawing, the table includes spaced angle bars 23 and 24 respectively which are held in spaced relation with each other, rollers 25 being disposed between the bars 23 and 24 to facilitate the moving of logs or boards over the table to bring them to a position opposite the saw blade.

Mounted at the end of the table is a guard 26 which is provided with a forwardly extended end portion 27 acting as a rest for the log or board being cut by the saw. The reference character 28 indicates an angularly disposed brace rod which extends from the bar 23, where it is connected to the guard 26 where it is connected at 29.

The saw is mounted in the bearings 30 carried by the bars 31 of the auxiliary end frame, the saw being mounted on one end of the shaft 32 which carries the power pulley 33 at the opposite end thereof, so that a belt from a suitable power device not shown may be employed for rotating the shaft 32 and the saw blade supported at one end thereof.

From the foregoing it will be obvious that a log or board positioned on the movable table, may be moved in a horizontal plane towards the saw and at right angles to the plane of operation of the saw, eliminating the necessity of lifting the weight of the log or board in order to accomplish this inward movement.

I claim:—

1. In a wood saw, a frame, a saw blade mounted for rotation at one end of the frame, said frame including vertical bars, a table including vertical bars and having elongated openings formed adjacent to their upper ends, said first mentioned bars having elongated openings, connecting bars having pivotal connection with the vertical bars adjacent to the lower ends thereof, and having bolts secured adjacent to the upper ends thereof and movable through the elongated openings, and a plurality of rollers carried by the table.

2. In a wood saw, a frame, vertical bars forming a part of the frame, a table having pivotal connection with the frame, said table including vertical bars, connecting bars pivotally connected to the vertical bars of the frame and table, means for connecting the upper ends of the connecting bars to the vertical bars to permit the upper ends of the connecting bars to move longitudinally of the vertical bars, and rollers carried by the table.

In testimony that I claim the foregoing as my own, I have hereto affixed my signature.

ARTHUR LEGBAND.